Dec. 22, 1964     C. R. WOODBURY, JR     3,162,318
BABY FOOD FEEDER
Filed Sept. 7, 1962
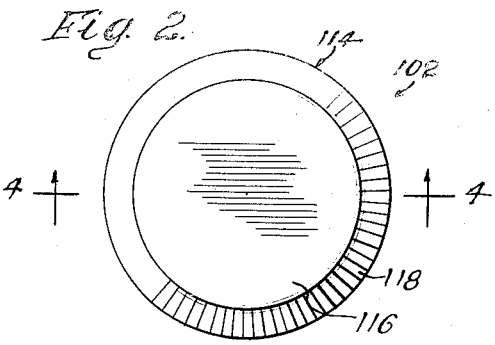
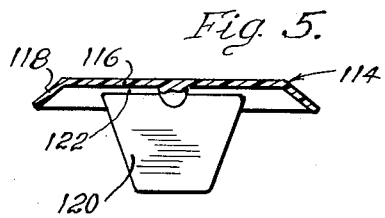
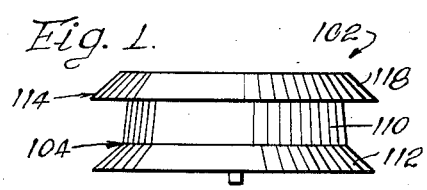
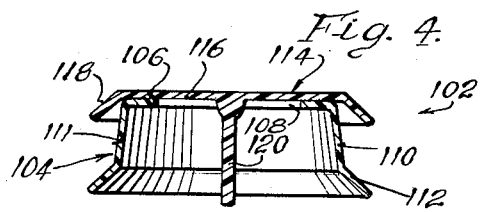
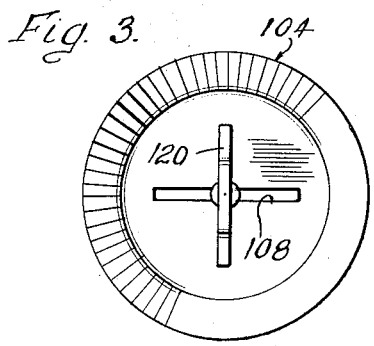
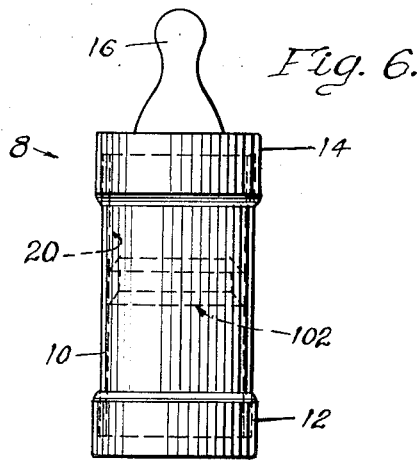
Inventor:
Clifford R. Woodbury, Jr.

United States Patent Office 3,162,318
Patented Dec. 22, 1964

3,162,318
BABY FOOD FEEDER
Clifford R. Woodbury, Jr., 7747 N. Hermitage,
Chicago, Ill.
Filed Sept. 7, 1962, Ser. No. 221,957
6 Claims. (Cl. 215—11)

The present invention relates to baby food feeders, and more particularly to that general kind disclosed and claimed in my copending application, Ser. No. 4,677, filed Jan. 26, 1960.

The invention additionally relates to a new kind of piston for use in such a feeder.

A broad object of the invention is to provide a novel piston for use in such a feeder, and to a feeder embodying that novel piston.

Another object is to provide a new piston of the character referred to, that is easily cleaned and lends itself to facility in molding.

A further object is to provide such a piston and feeder incorporating it, in which, because of the characteristics of the piston, the feeder becomes more effective.

Other objects and advantages of the invention will appear from the following detailed description taken in conjunction with the accompanying drawings in which—

FIGURE 1 is an edge view of the novel piston of the present invention;

FIGURE 2 is a top view of the piston shown in FIG. 1;

FIGURE 3 is a bottom view of the piston shown in FIGS. 1 and 2;

FIGURE 4 is a sectional view taken on line 4—4 of FIG. 2;

FIGURE 5 is a sectional view of one of the parts of the piston of FIGS. 1-4, but at right angles to the view of FIG. 4; and FIGURE 6 is a view of a feeder including the piston of the invention.

Referring in detail to the drawings, attention is directed to FIG. 6 illustrating a feeder indicated in its entirety at 8, and which includes a novel piston 102, made according to the present invention. The parts of the feeder other than the piston may be the same as or similar to those illustrated in my application mentioned above, namely, body member 10, caps 12 and 14 and nipple or mouthpiece 16. The body member 10 has an inner surface 20 engaged by the periphery of the piston, the piston thereby forming a seal to the portion of the interior containing the food, and thereby forcing the food forwardly under the action of atmospheric pressure in response to withdrawal of the food through the nipple. Reference may be had to the above mentioned copending application for additional details.

The piston 102, as shown in FIGS. 1-5, is made up of two parts for facilitating the cleaning thereof, and facilitating its manufacture, as well as for providing two trailing conical peripheral portions for engaging the inner surface of the body member 10. One part, 104, is generally of cup shape having a central flat web portion 106 provided with a slot 108 therein, and a surrounding skirt portion 110. The skirt portion includes a wall portion 111 diverging downwardly, or trailingly, for facilitating molding thereof, and a terminal conical peripheral portion 112.

The other part, 114, has a central flat portion 116 with a surrounding conical peripheral portion 118. Integral with and extending downwardly from the flat portion 116 is a leaf or vane 120 connected with the flat portion at the center and having portions spaced therefrom at 122 a distance similar to, or slightly less than, the thickness of the flat web portion 106.

The parts are assembled by inserting the vane 120 through the slot 108 and rotating the two parts relatively about a quarter turn. The parts are positioned in the assembly in such a way that the conical peripheral portions 112 and 118 extend in the same general direction. The piston is inserted in the body member with both peripheral portions disposed in trailing direction relative to its movement in following the food. This piston possesses all of the advantages of the piston 18 of the above mentioned application, such as axially spaced leading and trailing elements, the conical peripheral portion on the leading element, and the finger grip element in the form of the vane 120. It possesses the further advantage that the two conical peripheral portions provide a greater sealing effect and resist rearward movement of the piston, and as a practical matter prevent such movement.

The piston is preferably made of a suitable and known plastic material, but it may be made of other materials instead, if desired, such as rubber. As in the case of the piston 18 of the above application, the conical peripheral portions 112 and 118 are preferably more flexible than the remaining portions.

A further advantage of the present piston resides in the facility in manufacture in that all concave conformations of the individual parts are free of opposed surfaces. Furthermore, the piston can be easily cleaned in disassembled condition.

Although the preferred form of the peripheral portions 112 and 118 is conical, it is within the scope of the invention that those portions be curved or rolled, if such shape should be desired, the consideration being that the angle of inclination with the wall of the body member be less than 90°.

While I have shown and described herein a preferred form of the invention it will be understood that changes may be made therein within the scope of the appended claims.

I claim:

1. Piston means having leading and trailing transverse elements spaced apart axially, each having a peripheral portion generally conical in shape and inclined in trailing direction, the peripheral portions being substantially equal in diameter and constituting the greatest diameter of the piston means.

2. The invention set out in claim 1 in which the piston means is of plastic material and formed of separable parts, each having a peripheral portion generally conical in shape and inclined in trailing direction, the parts being detachably secured together by a slot in the trailing element and a flat vane on the leading element fitted in the slot and engaging the marginal portions of the slot by relative transverse positions of the slot and vane.

3. The invention set out in claim 2 in which a forward one of the parts includes a central flat web portion and directly from which its conical portion extends and a rearward one of the parts includes a central flat web portion and a surrounding wall extending rearwardly therefrom, and its conical portion extends from the surrounding wall, and further in which the piston means is free-floating and defined forwardly by the flat web portion of the forward part and rearwardly by the extreme edge of the conical portion of the rearward part.

4. Piston means comprising a pair of parts of preformed shape, each having a transverse element and a rearwardly trailing conical peripheral portion, all portions other than the conical peripheral portions being relatively rigid and the conical peripheral portions being at least slightly more flexible than the other portions.

5. The invention set out in claim 4 in which the marginal edges of the conical portions are of substantially equal diameter.

6. The invention set out in claim 4 in combination with feeder means including a body member in which the piston means is disposed in sealing engagement with the inner surface therewith, and a mouthpiece secured to the body member.

References Cited in the file of this patent

UNITED STATES PATENTS

| | | |
|---|---|---|
| 2,469,489 | Allen et al. | May 10, 1949 |
| 2,853,209 | McArdle | Sept. 23, 1958 |

FOREIGN PATENTS

| | | |
|---|---|---|
| 468,029 | Great Britain | June 28, 1937 |